United States Patent
Beyer et al.

(10) Patent No.: US 11,308,456 B2
(45) Date of Patent: Apr. 19, 2022

(54) FEEDBACK BASED AUTOMATED MAINTENANCE SYSTEM

(71) Applicant: Microsoft Technology Licensing, LLC, Redmond, WA (US)

(72) Inventors: Glen R. Beyer, Redmond, WA (US); Michael Czamara, Redmond, WA (US); James H. Wood, Redmond, WA (US); Thirukumaran Appadurai, Redmond, WA (US); Osvaldo P. Morales, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 865 days.

(21) Appl. No.: 15/986,386

(22) Filed: May 22, 2018

(65) Prior Publication Data

US 2019/0362321 A1 Nov. 28, 2019

(51) Int. Cl.
*G06Q 10/00* (2012.01)
*H04L 67/10* (2022.01)

(52) U.S. Cl.
CPC .............. *G06Q 10/20* (2013.01); *H04L 67/10* (2013.01)

(58) Field of Classification Search
CPC .... G06Q 10/20; G06Q 20/1085; G06Q 20/18; G06Q 20/32; G06Q 10/08; G06Q 20/405; G06Q 10/063; G06Q 50/06; G06Q 10/00; G06Q 20/322; G06Q 20/10; G06Q 20/20; G06Q 20/409; G06Q 99/00; G06Q 30/0278; H04L 67/12; H04L 67/04; H04L 67/10; H04L 63/08; H04L 67/125; H04L 67/28; H04L 2209/80; H04L 67/025; H04L 12/06; H04L 2012/2841; G05B 15/02;

(Continued)

(56) References Cited

U.S. PATENT DOCUMENTS

| 9,721,223 B2* | 8/2017 | Gentile | ................. G06Q 10/08 |
| 2010/0228676 A1* | 9/2010 | Librizzi | ............. H04M 1/0287 |
| | | | 705/306 |
| 2015/0005945 A1 | 1/2015 | Toh | |
| 2015/0317337 A1 | 11/2015 | Edgar | |

OTHER PUBLICATIONS

Paschich, The 6:1 preventative maintenance golden rule, https://gridium.com/preventive-maintenance-golden-rule/ (Year: 2016).*
Kim et al., 'An Intelligent Improvement of Internet-Wide Scan Engine for Fast Discovery of Vulnerable IoT Devices', https://www.mdpi.com/2073-8994/10/5/151/htm (Year: 2018).*

(Continued)

*Primary Examiner* — Aryan E Weisenfeld
(74) *Attorney, Agent, or Firm* — Liang IP, PLLC (57) ABSTRACT

A system outputs data for performing an operation. The system confirms an identity of a device on which to perform the operation by receiving an input from the device and verifying that the input matches a known identifying information of the device. The system allows the operation to be performed on the device after confirming the identity of the device. The system receives feedback from a monitoring system that monitors states of a plurality of devices including the device, including a state of the device after the operation is performed on the device. The system determines whether the state of the device received in the feedback matches an expected state of the device after the operation is performed on the device. The system outputs data for performing a next operation after determining that the state of the device received in the feedback matches the expected state of the device.

20 Claims, 4 Drawing Sheets

(58) Field of Classification Search
CPC ............ G05B 23/0283; G05B 19/4183; G05B 19/042; G05B 19/418; G05B 19/0426; G05B 2219/32014; G05B 2219/24001; G05B 2219/24018; G05B 2219/24019; G05B 2219/2642; G05B 19/054; G05B 2219/23161; G05B 2219/24048; G05B 2219/31391; G05B 2219/32226; G05B 2219/37095; G05B 2219/50185; G05B 2223/06; G05B 23/0235; G05B 19/4063; G05B 2219/2614; G05B 2219/2619; G05B 2219/31088; G05B 19/148; G05B 19/1485; H04W 24/00; H04W 12/08; H04W 12/00512; H04W 4/024; H04W 4/44; H04W 52/0296; H04W 76/25; H04W 88/08; G06K 2209/19; G06K 9/22; G21B 1/25; G08G 5/0082; G08G 5/003; G08G 1/163; H02J 50/80; H02J 3/386; H02J 7/007; G06F 9/465; G06F 16/24; G06F 9/46; G06F 11/2294; G06F 1/189; G06F 11/30; G06F 11/3055; G06F 16/43; G06F 2221/0704; G06F 11/3485; G06F 1/3206; G06F 9/44505; G06F 11/3051; G06F 11/3058; G06F 3/1423; H04B 10/07955; H04B 10/695; B66B 5/0087; B66B 1/3446; B66B 11/0246; B66B 5/0006; G21D 3/04; C12G 1/0213; H01H 2229/062

See application file for complete search history.

(56) References Cited

OTHER PUBLICATIONS

"Machine Learning—the Next Step in Infrastructure Automation", Retrieved from«https://www.virtualtechgurus.com/machine-learning-the-next-step-in-infrastructure-automation/», Jan. 30, 2018, 3 Pages.

Branscombe, Mary, "Machine Learning Tools are Coming to the Data Center", Retrieved from«http://www.datacenterknowledge.com/archives/2017/07/05/machine-learning-tools-are-coming-to-the-data-center», Jul. 5, 2017, 9 Pages.

Galovski, Vele, "Why Hardware Suppliers Need Artificial Intelligence, Business Analytics, and Machine Learning", Retrieved from«http://blog.tsia.com/blog/why-hardware-suppliers-need-artificial-intelligence-business-analytics-and-machine-learning», Sep. 1, 2017, 9 Pages.

Marvin, Rob, "The Best Employee Monitoring Software of 2017", Retrieved from«http://in.pcmag.com/software/117679/guide/the-best-employee-monitoring-software-of-2017», Dec. 1, 2017, 16 Pages.

Ismail, Nick, "Preparing for AI with Predictive Maintenance", Retrieved from«http://www.information-age.com/preparing-ai-predictive-maintenance-123467203/», Jul. 10, 2017, 6 Pages.

Revell, Timothy, "AI Tracks your Every Move and Tells Your Boss if you're Slacking", Retrieved from«https://www.newscientist.com/article/2119734-ai-tracks-your-every-move-and-tells-your-boss-if-youre-slacking/», Jan. 30, 2017, 3 Pages.

Moss, Sebastian, "The Machine Itself", Retrieved from «http://www.datacenterdynamics.com/content-tracks/design-bulld/the-machine-itself-the-state-of-al-in-the-data-center/99391.fullarticle», Nov. 28, 2017, 5 Pages.

* cited by examiner

FEEDBACK BASED AUTOMATED MAINTENANCE SYSTEM

FIELD

The present disclosure relates generally to performing maintenance procedures and more particularly to feedback-based automated maintenance systems at large facilities such as datacenters and manufacturing plants.

BACKGROUND

Generally, maintaining infrastructure and equipment at large facilities such as datacenters and manufacturing plants involves creating detailed maintenance procedures for the systems and subsystems that are installed and operating at these facilities. Often, one or more voluminous manuals detailing numerous (hundreds or thousands of) steps for performing the maintenance procedures are created. One or more highly skilled technicians need to follow these steps in a sequence and in a coordinated manner to perform the maintenance procedures.

Periodically, some of the maintenance procedures and/or the steps in the maintenance procedures may need to be revised for different reasons (e.g., upgrading a system, removing a system, adding a system, etc.). These revisions need to be taken into account while performing the maintenance procedures.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for performing a maintenance procedure comprising a plurality of steps to be performed on a plurality of devices comprises a processor and a non-transitory computer-readable medium to store instructions for execution by the processor. The instructions are configured to output data for performing a first step of the plurality of steps of the maintenance procedure, where the first step indicates an action to be performed on a first device of the plurality of devices. The instructions are configured to receive a first input from one of the plurality of devices, where the first input indicates identity of the one of the plurality of devices. The instructions are configured to confirm that the one of the plurality of devices is the first device by comparing the first input to a first information about the first device stored in a database. The instructions are configured to allow performance of the action on the first device after confirming that the one of the plurality of devices is the first device. The instructions are configured to receive, after the action is performed on the first device, a second input from a second system monitoring states of the plurality of devices, where the second input indicates a state of the first device after the action is performed on the first device. The instructions are configured to confirm whether the state of the first device received in the second input from the second system matches an expected state of the first device after the action is performed on the first device, where the expected state is stored in the database. The instructions are configured to output data for performing a second step of the plurality of steps after confirming that the state of the first device received in the second input matches the expected state of the first device. The instructions are configured to prevent the action from being performed on a device other than the first device and to prevent the second step from being invoked unless and until the first step is completed successfully.

In other features, the instructions are configured to receive the plurality of steps from a remote system via a network.

In other features, the instructions are configured to receive the first input by sensing an identifying information associated with the first device.

In other features, the instructions are configured to receive the first information and the expected state from a remote system via a network.

In other features, the instructions are configured to perform the action on the first device by sending data to the first device.

In other features, the instructions are configured to receive a third input from the first device in response to performing the action on the first device; store the third input; retrieve the stored third input while performing the second step in response to the second step requiring the third input; and use the retrieved third input in the performance of the second step.

In other features, the instructions are configured to log an amount of time taken to complete a portion of the plurality of steps and update a previously used estimate of time for completing the portion of the plurality of steps based on the logged amount of time taken to complete the portion of the plurality of steps.

In other features, the instructions are configured to receive a plurality of inputs from the second system in response to performing one or more of the plurality of steps a plurality of times; analyze the plurality of inputs; and determine whether to reduce a frequency of performing a portion of the maintenance procedure or whether to reduce a number of steps from the one or more of the plurality of steps.

In other features, the instructions are configured to select one or more of the plurality devices, where the selected devices are remotely operable; confirm identities of the selected devices; and send data to the selected devices after confirming the identities of the selected devices to operate the selected devices in a predetermined sequence.

In still other features, a system comprising a processor and a non-transitory computer-readable medium to store instructions for execution by the processor. The instructions are configured to output data for performing an operation from a series of operations. The instructions are configured to confirm an identity of a device on which to perform the operation by receiving an input from the device and verifying that the input matches a known identifying information of the device. The instructions are configured to allow the operation to be performed on the device after confirming the identity of the device. The instructions are configured to receive feedback from a monitoring system that monitors states of a plurality of devices including the device, where the feedback indicates a state of the device after the operation is performed on the device. The instructions are configured to determine whether the state of the device received in the feedback matches an expected state of the device after the operation is performed on the device. The instructions are configured to output data for performing a next operation after determining that the state of the device received in the feedback matches the expected state of the device. Confirming the identity of the device prevents the operation from being performed on another device. Outputting the data for performing the next operation after determining that the state of the device received in the feedback matches the expected state of the device ensures that the next operation is performed only after the operation presently performed on the device is completed successfully.

In other features, the instructions are configured to receive the data for performing the operation and the data for performing the next operation from a remote system via a network; and receive the known identifying information and the expected state from the remote system via a network.

In other features, the instructions are configured to receive the input by sensing an identifying information associated with the device; and perform the operation on the device by transmitting data for performing the operation to the device in response to the device being remotely operable.

In other features, the instructions are configured to receive a response from the device when the operation is performed on the device; store the response; retrieve the stored response while performing the next operation; and use the retrieved response in the performance of the next operation.

In other features, the instructions are configured to store an amount of time taken to complete one or more of the series of operations and update a previously used estimate of time for completing the one or more of the series of operations based on the stored amount of time taken to complete the one or more of the series of operations.

In other features, the instructions are configured to receive a plurality of inputs from the monitoring system in response to performing one or more of the series of operations a plurality of times; analyze the plurality of inputs; and determine whether to reduce a frequency of performing the one or more of the series of operations or whether to reduce a number of operations from the one or more of the series of operations.

In other features, the instructions are configured to select one or more of a plurality devices, where the plurality devices are remotely operable; confirm identities of the selected devices; and transmit, after confirming the identities of the selected devices, data to the selected devices to operate the selected devices in a predetermined sequence.

In still other features, a portable computing device comprises a processor and a non-transitory computer-readable medium to store instructions for execution by the processor. The instructions are configured to receive, from a first system, via a network, a plurality of steps for performing a procedure on a plurality of devices, where the procedure includes an installation procedure, a repair procedure, or a maintenance procedure. The instructions are configured to display, on the portable computing device, data for performing a first step of the plurality of steps of the procedure, where the first step indicates an action to be performed on a first device of the plurality of devices. The instructions are configured to sense identifying information located on one of the plurality of devices. The instructions are configured to retrieve, via the network, an identifying information of the first device stored in a database. The instructions are configured to compare the sensed identifying information to the identifying information of the first device retrieved from the database. The instructions are configured to confirm, based on the comparison, whether the one of the plurality of devices is the first device. The instructions are configured to allow, in response to confirming that the one of the plurality of devices is the first device, performance of the action on the first device. The instructions are configured to receive, after the action is performed on the first device, feedback from a second system monitoring states of the plurality of devices, where the feedback indicates a state of the first device after the action is performed on the first device. The instructions are configured to retrieve, from the database, via the network, an expected state of the first device after the action is performed on the first device. The instructions are configured to confirm whether the state of the first device received in the feedback matches the expected state of the first device retrieved from the database. The instructions are configured to display, on the portable computing device, data for performing a second step of the plurality of steps after confirming that the state of the first device received in the feedback matches the expected state of the first device. The instructions are configured to ensure that the action is not performed on a device other than the first device and that the second step is not displayed unless the first step is completed successfully.

In other features, the instructions are configured to perform the action on the first device by transmitting data to the first device when the first device is remotely operable; receive an input from the first device in response to performing the action on the first device; and use the input in the performance of the second step.

In other features, the instructions are configured to log an amount of time taken to complete a portion of the procedure and update a previously used estimate of time for completing the portion of the procedure based on the log; and log data associated with performing the procedure and determine based on an analysis of the logged data whether to reduce a frequency of performing a portion of the procedure or whether to reduce a number of steps of the procedure.

In other features, the instructions are configured to select one or more of the plurality devices, where the selected devices are remotely operable; confirm identities of the selected devices; and send data to the selected devices after confirming the identities of the selected devices to operate the selected devices in a predetermined sequence.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Performing maintenance procedures using paper-based manuals tend to pose many problems and make the procedures error-prone due to potential for human error. For example, a technician performing a step may not perform the step correctly or completely. For example, a technician may perform the operation mandated by the step on a wrong device or perform a wrong operation. Although a successful execution of the step may be a prerequisite to performing a next step, the technician may skip the step partly or entirely for some reason and may proceed to execute the next step, which can cause problems. As another example, when executing a step, the technician may need to record data that needs to be used in a subsequent step. However, the technician may record incorrect data or accidently use correctly recorded data from a different step in the subsequent step, which can cause problems. As yet another example, when executing a step, the technician may need to identify a component (e.g., a circuit breaker) from several closely arranged and/or similar-looking components, and may accidently operate a different component than that mandated by the step, which can cause problems. Further, in a 24×7 operation environment like datacenters, inadvertent operation of a device may lead to a power loss to servers causing significant business impact through loss of customers. Accidental operation of a device like turning on power to a wrong device may lead to a serious safety incident including loss of life. There are many other examples of errors that can occur as a result of technicians using paper-based systems and procedures.

The present disclosure eliminates the error-prone paper-based systems and procedures. Instead, the present disclosure proposes a graphical user interface (GUI) based system that automates the maintenance procedures and that eliminates or minimizes the potential for human error. Specifically, the GUI based system presents a maintenance procedure one step at a time on a screen of a computing device (e.g., a handheld device). Unless the step is confirmed to be performed on a correctly identified device and is confirmed to be correctly executed using a feedback system explained below, a next step is not presented on the screen. This feature not only ensures that each step is correctly executed but also prevents the possibility of proceeding to the next step unless the prior step is executed correctly and completely. Thus, the GUI-based system eliminates the problems posed by the error-prone paper-based system.

More specifically, the GUI-based system includes at least four features for each step being performed: first, confirming correct identity of the equipment to be operated in a step being performed; second, confirming or validating the operation performed on the equipment in the step being performed; third, automatic execution of the step through remotely controlling the device using the GUI; and fourth, recording device data including, for example, voltage, current, frequency, temperature, humidity, pressure, air flow, and other device parameters associated with the device, where available.

The identification portion can be performed in many ways. For example, when a step presented on a handheld device includes performing an operation on a device, the device may have a barcode, RFID, or some identifying information associated with it. The identifying information is captured by the handheld device (e.g., by scanning the barcode or RFID, or by taking a photograph of the device, and so on). The identifying information captured from the device is compared with the identifying information of the device stored in a database in the GUI-based system. Only after verifying or confirming that the scanned device is in fact the correct device that is to be operated in the present step, the operator is allowed to proceed and operate the device. (For example, the identity confirmation may be indicated a green light on the screen of the handheld device or by highlighting (enabling) a button on the screen that allows the operator to remotely operate the device by touching the button.) Otherwise, the operator is asked to locate the correct device.

This feature prevents inadvertent operation of a wrong device (e.g., tripping a wrong circuit breaker). In some implementations, if the device is capable of being remotely controlled, the GUI-based system provides the ability to operate the device remotely (i.e., automatically and directly by touching a button on the screen of the handheld device) instead of manually operating the correct device. This feature eliminates the possibility of the operator accidently operating the wrong device (e.g., a similar device located adjacent to the correct device).

Once the identity of the device is confirmed and the identified device is operated, the operation performed on the identified device is confirmed or validated as follows. Typically, a monitoring system may monitor states of the equipment installed at a facility such as a datacenter. For example, the states may include power states (e.g., whether the equipment is powered on or off). Depending on the type of equipment, some equipment may have additional states. For example, networking equipment may have a state indicating whether the equipment is on or off, and also a state indicating whether communication is turned on or off. As another example, a storage device may have a state indicating whether the storage device is powered on or off, a state indicating whether the storage device is full, and a state indicating whether the storage device is in a power save mode (e.g., a disk drive may be spun down but not powered off); and so on. Each time an equipment transitions from one state to another (e.g., from an on state to an off state), the monitoring system may receive a signal or an indication from the equipment indicating a current state of the equipment. The state of the device may also be validated using the device data such as, for example, voltage, current, frequency, temperature, humidity, pressure, air flow, and other device parameters, where available.

The present disclosure proposes using the state information of the identified device that is received by the monitoring system as feedback for the GUI-based system to confirm or validate the operation performed on the identified device in the current step of the maintenance procedure. If the state information received from the monitoring system matches the expected state of the device after the operation is performed on the device, the step is deemed performed correctly and completed successfully. Only then the next step of the maintenance procedure is presented on the screen of the handheld device.

The GUI-based system is easy to follow to the extent that operators with a lower skill level than skilled technicians can follow each step and perform the maintenance procedures. The operators need not possess in-depth knowledge of all the steps. Further, the GUI-based system can eliminate another source of error—manual data entry—by automatically sensing some of the data (e.g., a meter reading) with a touch of a button on the GUI. The GUI-based system further automates correct use of that data in a future step without the need for the operator to go back to a past step, look up what was recorded in the past step, and then enter that in a later step (e.g., to take an action based on the previously recorded data and the current data), all of which is done automatically in the GUI-based system. In a large setting such as a datacenter, these features can translate into huge savings of resources (e.g., time saved in entering, reviewing, and re-entering data; time saved in correcting any errors resulting from the previous and current data entries; and money saved by employing operators with lower skills).

The GUI-based system of the present disclosure provides many other benefits. For example, many maintenance procedures are performed based on manufacturers' recommendations. However, in practice, the manufacturers' recommendations can be modified. For example, the frequency of a recommended procedure may be changed depending on knowledge gained from performing the recommended procedure a number of times. The GUI-based system stores a log of the maintenance procedures. By learning from these logs (i.e., by analyzing these logs using machine learning algorithms), such modifications can make the maintenance procedures more efficient and cost effective. By applying machine learning algorithms to the log data, maintenance frequency can be optimized based on device usage data. As an example, once a year maintenance cycle may be required instead of twice a year standard recommendation by the manufacturer for a device that is used less frequently; and money can be saved by using less frequent replacement of parts and labor. As another example, the actual amount of time logged to perform a procedure can be monitored, and time estimates for performing the procedure can be updated with the actual observed times, which can increase the efficiencies and reduce downtime requirements for performing maintenance procedures. In other words, workflows and cycle times associated with maintenance procedures can be optimized by analyzing the logs kept by the GUI-based system.

As yet another example, when devices are remotely operable, the devices can be automatically selected and operated in a desired sequence. Such abilities can be helpful in transitioning power supply for the devices from one power source to another, for example. Many other examples and extensions of the teachings of the present disclosure are contemplated. These and other aspects of the GUI-based system of the present disclosure are now described below in detail.

It should be noted that the scope of the present disclosure is not limited to performance of maintenance procedures in large facilities such as datacenters, factories, and manufacturing plants. Indeed, the teachings of the present disclosure are not limited to maintenance procedures alone either. Rather, the teachings of the present disclosure are applicable and can be extended to any system that requires extensive, rigorous, and elaborate installation, maintenance, or repair procedures. The teachings of the present disclosure can be extended to installation, maintenance, and repair procedures for any system that includes components with attached verifiable identifiers, and that includes a system for monitoring the states of the components, which can be used to confirm proper execution of each step before progressing to the next step.

Further, the teachings of the present disclosure can be applied across a vast variety of industries as well. Non-limiting examples include complex transportation systems such as ships, airplanes, satellites, and other vehicles (e.g., autonomous vehicles having a multitude of complex systems). In other words, the teachings of the present disclosure can be utilized in any system that requires performing a multi-step procedure.

The present disclosure significantly improves the specific technological field of performing installation, maintenance, and repair procedures involving multiple steps in large facilities such as datacenters and factories. For example, the GUI-based system of the present disclosure automates and optimizes these procedures by minimizing human interactions involved in performing these procedures, which in turn reduces the potential for human errors. Further, the GUI-based system utilizes machine learning to make these procedures more efficient by eliminating or reducing the number of steps in these procedures and/or reducing frequencies of performing these procedures or portions thereof. Additionally, the GUI-based system makes it possible to perform these procedures remotely. For example, the GUI-based system makes it possible to perform these procedures on equipment located in datacenters located all over the world.

Figure 1A:
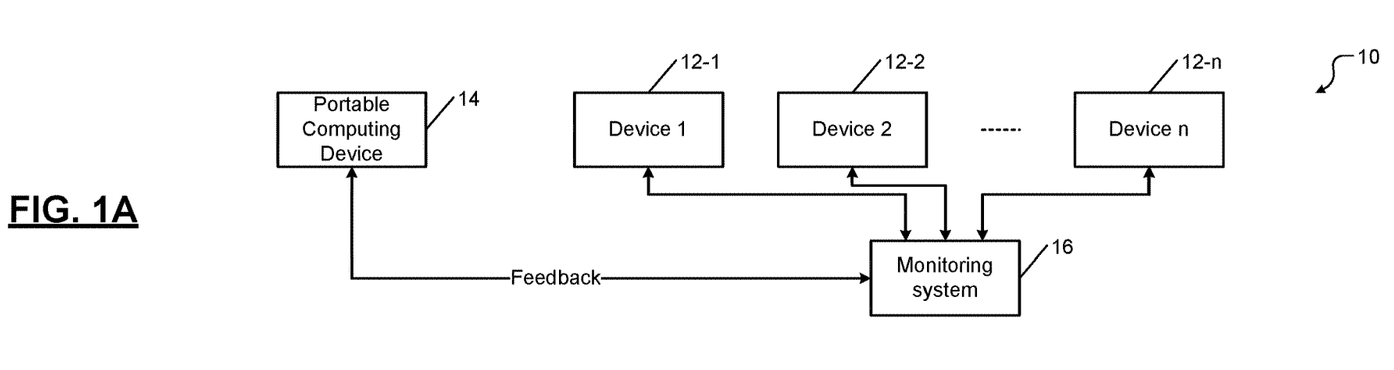
FIGS. 1A and 1B show a simplified schematic of a graphical user interface (GUI)-based system for performing a multi-step procedure one step at a time according to the present disclosure.
Figure 1B:
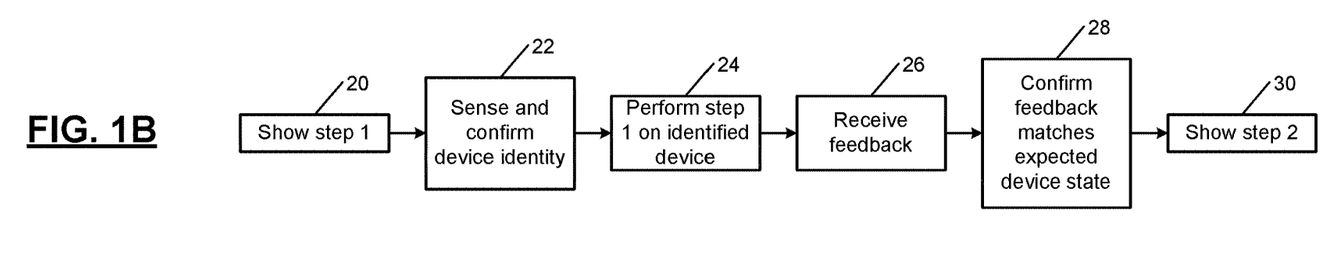

FIGS. 1A and 1B show a simplified schematic of the GUI-based system 10 according to the present disclosure. FIG. 1A shows a plurality of devices (or equipment) 12-1, 12-2, . . . , and 12-*n* (collectively devices 12) on which a procedure (e.g., a maintenance procedure) is performed on them using a portable computing device 14. For example, the portable computing device 14 may include a laptop computer, a tablet, or a smartphone. A monitoring system 16 monitors states of the devices 12. The portable computing device 14 receives feedback regarding states of the devices 12 when the procedure is performed.

FIG. 1B shows an abbreviated example of a sequence in which the portable computing device 14 performs the procedure. For example, at 20, the portable computing device 14 runs an application that shows only step 1 on a screen of the portable computing device 14. In some implementations, the portable computing device 14 may download the application from a server via a network (e.g., from a server in cloud). In some implementations, the portable computing device 14 may receive the steps shown, one step at a time, from a server via a network (e.g., from a server in cloud). The server and the network are illustrated using an example of a client-server architecture in FIGS. 3A-3C, which is described below.

At 22, the portable computing device 14 senses the identity of a device (one of the devices 12) that is to be operated upon in step 1. For example, an operator carrying the portable computing device 14 may approach the device and scan a barcode or RFID on the device (e.g., Device 12-1). The operator may also take a photograph of the device. The portable computing device 14 may verify that the correct device is scanned (i.e., the operator is proximate to the correct device) by comparing the identity data captured from the device to the known identity data of the device. For example, the known identity data for the devices 12 may be stored in a database in a server (e.g., in cloud), or the database may be downloaded in the portable computing device 14 from the server along with the application.

At 24, upon verifying the identity of the device, the operation specified in step 1 may be performed on the identified device. For example, the operator may perform the operation on the identified device. Alternatively, if the identified device is remotely operable, the operator may touch a button on the screen of the portable computing device 14, which may send a command to the device to perform the operation on the identified device.

At 26, the portable computing device 14 receives feedback from the monitoring system 16 regarding the state of the device operated in step 1. At 28, the portable computing device 14 may verify that the state of the device matches the expected state in which the device should be after the operation is performed on the device. The portable computing device 14 may verify the state by comparing the state of the device received in the feedback to the expected state, which may be stored in a database in a server (e.g., in cloud, or the database may have been downloaded in the portable computing device 14 from the server along with the application).

In some implementations, at least one of scanning the device, verifying the identity of the scanned device, issuing the command to the device to perform the operation specified in the step, and verifying the device state based on the feedback may be performed automatically (i.e., without operator input). At 30, after the verifying the device state based on the feedback, the next step (e.g., step 2) is displayed on the screen of the portable computing device 14. Accordingly, not only the identity of the correct device mentioned in the step is verified before performing the operation specified in the step but the next step is displayed only after confirming (based on feedback) that the current step is completed correctly and successfully.

Figure 2:
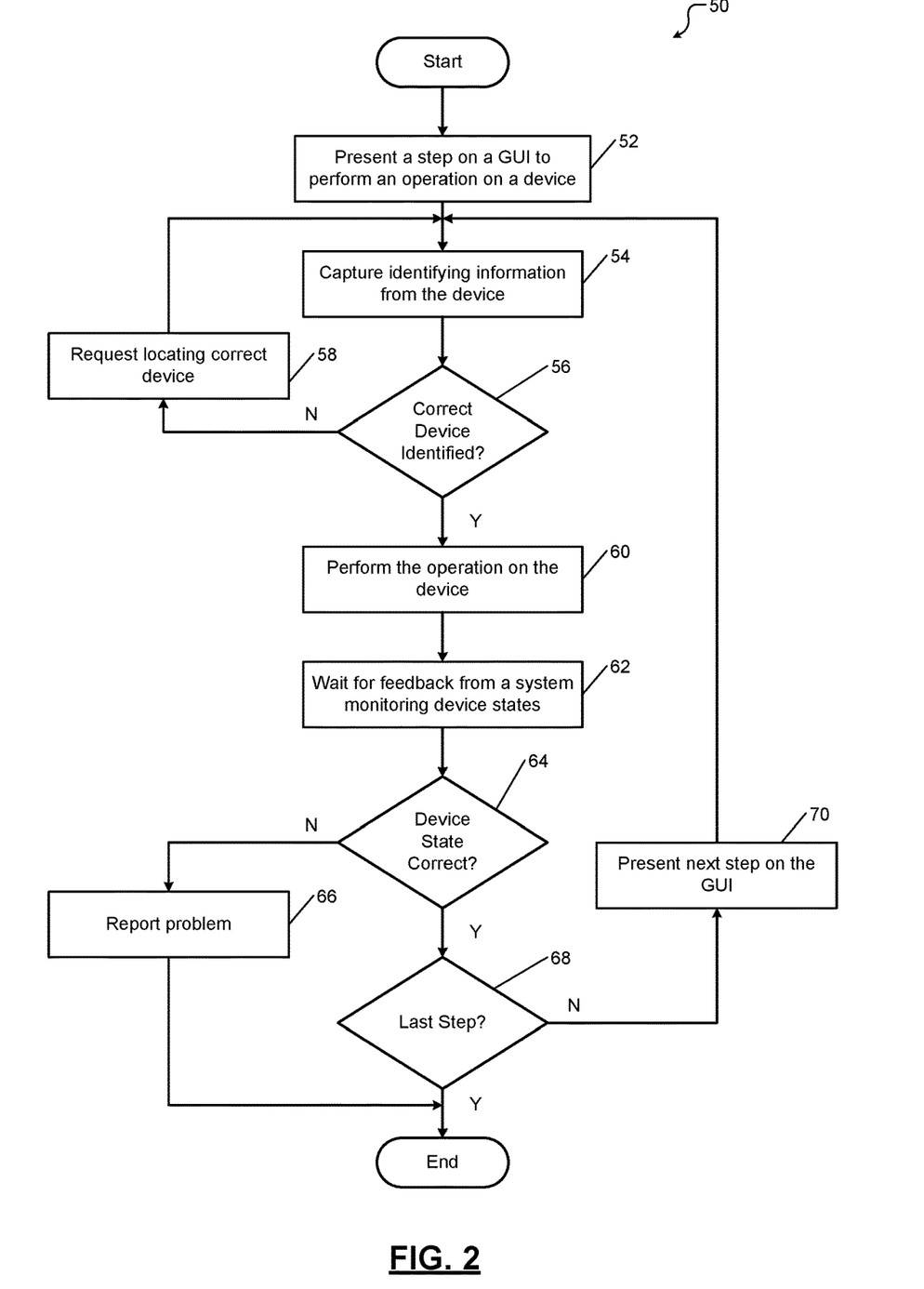
FIG. 2 shows a flowchart of a method for performing a multi-step procedure one step at a time according to the present disclosure.

FIG. 2 shows a detailed flowchart of a method 50 of performing the procedure one step at a time according to the present disclosure. As used herein, the term control denotes instructions stored in a memory and executed by a processor in the portable computing device 14. An example of the portable computing device 14 comprising the memory and the processor is shown and described below with reference to FIGS. 3A-3C (see client device 120-1 in FIG. 3B).

At 52, control presents a step (e.g., step 1) on the GUI (e.g., on the screen of portable computing device 14) to perform an operation on a device (e.g., Device 12-1). At 54, control captures identifying information from the device (e.g., by scanning a barcode or RFID on the device 12-1). At 56, control verifies whether the correct device has been located to perform the action specified in step 1. For example, control compares the identifying information captured from the device to the known identifying information for the device as explained above.

At 58, if the correct device is not identified (i.e., if the captured identifying information from the device does not match the known identifying information for the device), control prompts the operator by displaying an indication on the GUI to locate the correct device; and control returns to 54. At 60, if the correct device is identified (i.e., if the captured identifying information from the device matches the known identifying information for the device), control performs the operation specified in step 1 on the identified device.

At 62, control waits for feedback from the monitoring system 16 that monitors the states of the devices (e.g., devices 12). At 64, control determines whether the state of the device operated upon in step 1 as received in the feedback matches the expected state in which the device should be after the action specified in step 1 is performed on the device.

At 66, if the state of the device received in the feedback does not match the expected state for the device, control reports a problem on the screen (e.g., suggests an alternate action). Alternatively, at 68, if the state of the device received in the feedback matches the expected state for the device, control determines whether the current step is the last step in the procedure, in which case control ends. At 70, if the current step is not the last step, having completed the current step (step 1), control presents the next step in the GUI; and control returns to 54.

Figure 3A:
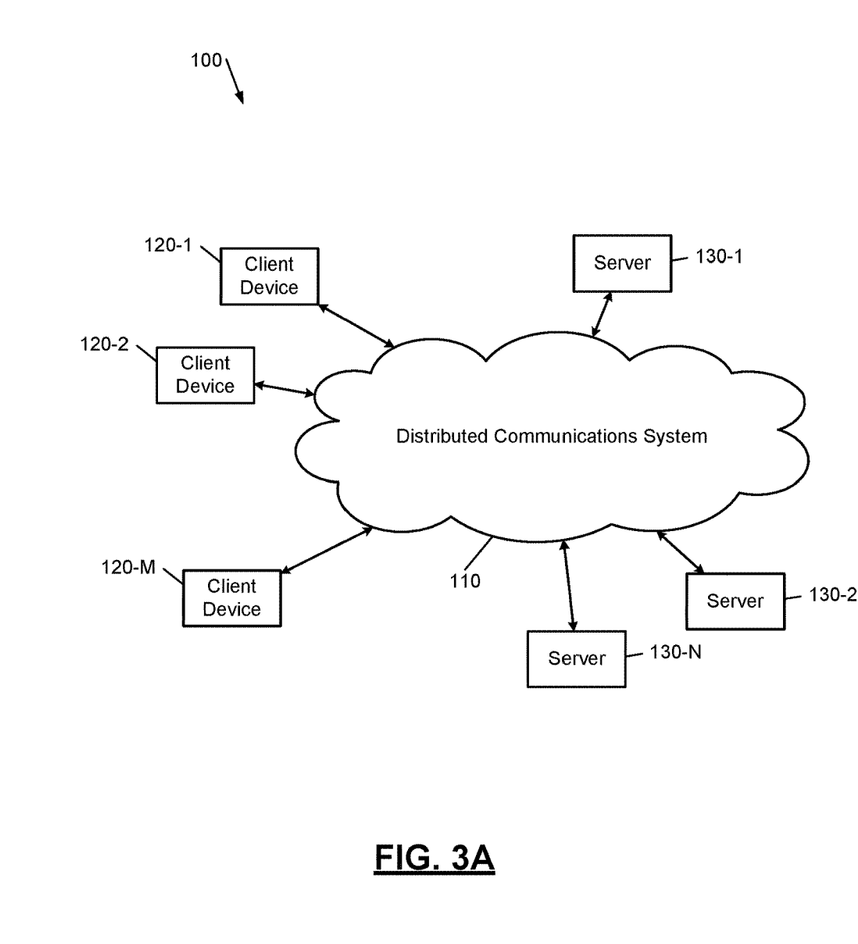
FIGS. 3A-3C show simplistic examples of a distributed computing environment for implementing the systems and methods of the present disclosure.
Figure 3B:
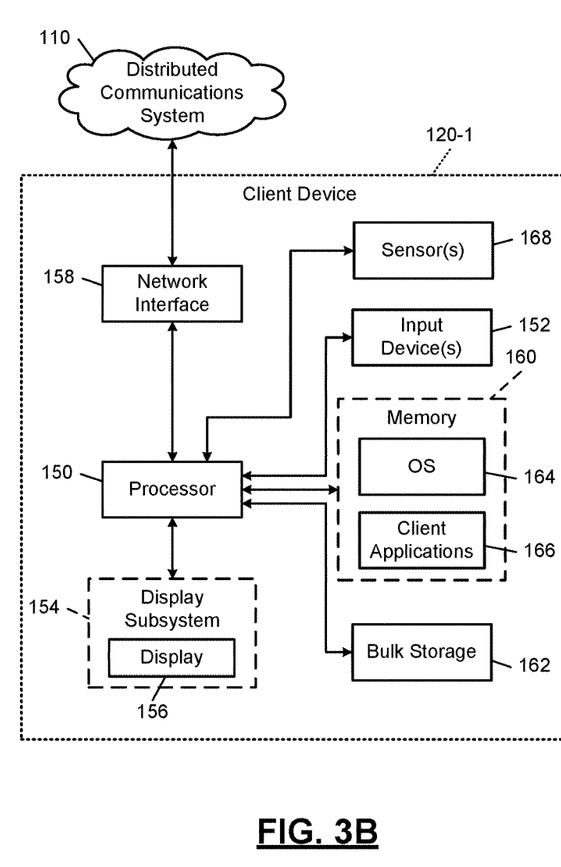
Figure 3C:
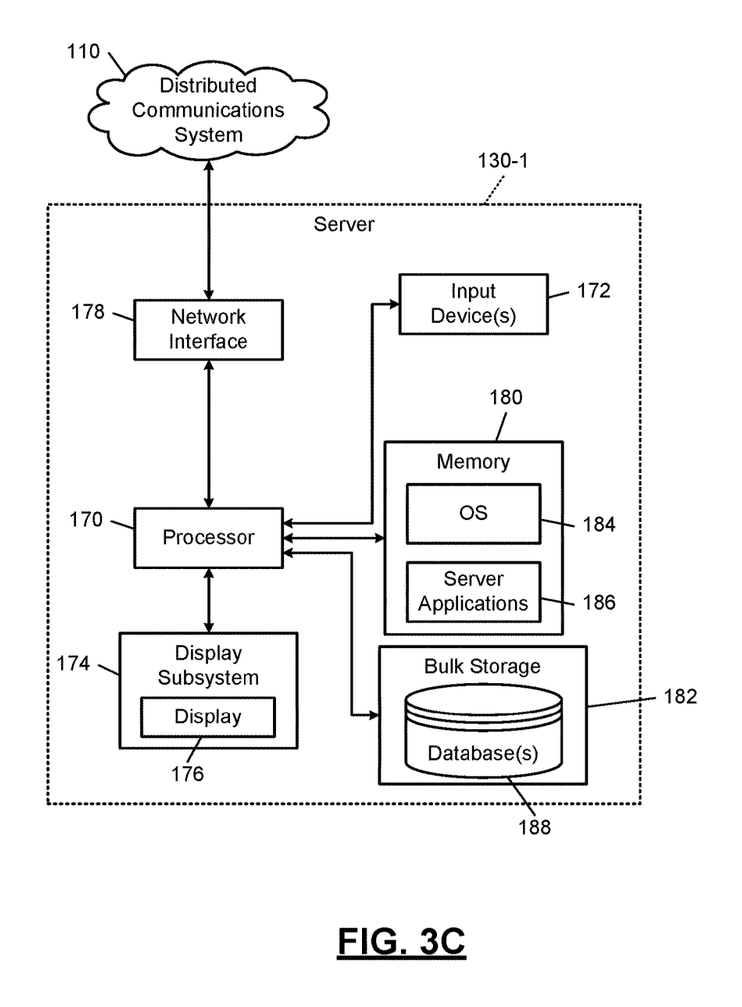

FIGS. 3A-3C show simplistic examples of a distributed computing environment in which the systems (e.g., system 10) and methods (e.g., method 50) of the present disclosure can be implemented. Throughout the description, references to terms such as servers, client devices, applications and so on are for illustrative purposes only. The terms server and client device are to be understood broadly as representing computing devices (including all elements shown in FIG. 1A) with one or more processors and memory configured to execute machine readable instructions. The terms application and computer program are to be understood broadly as representing machine readable instructions executable by the computing devices (e.g., instruction to perform the methods shown in FIGS. 1B and 2 and to perform the various operations of the GUI-based system 10 described throughout the present disclosure).

FIG. 3A shows a simplified example of a distributed computing system 100. The distributed computing system 100 includes a distributed communications system (hereinafter network) 110, one or more client devices 120-1, 120-2, . . . , and 120-M (collectively, client devices 120), and one or more servers 130-1, 130-2, . . . , and 130-N (collectively, servers 130). M and N are positive integers. The network 110 may include a local area network (LAN), a wide area network (WAN) such as the Internet, or other type of network. The client devices 120 and the servers 130 may be located at different geographical locations (e.g., on-premises and/or in cloud) and may communicate with each other via the network 110. The client devices 120 and the servers 130 connect to the network 110 using wireless and/or wired connections.

The client devices 120 may include smartphones, personal digital assistants (PDAs), tablets, laptop computers, personal computers (PCs), etc. The servers 130 may provide multiple services to the client devices 120. For example, the servers 130 may execute software applications developed by one or more vendors. The servers 130 may host multiple databases that are relied on by the software applications in providing services to users of the client devices 120.

In some examples, one or more of the servers 130 may execute an application (e.g., as SaaS) that provides multiple steps of a procedure (e.g., a maintenance procedure) to the client devices 120 as shown in and described with reference to FIGS. 1B and 2 and as further described below. The servers 130 may provide the steps to the client devices 120 one step at a time.

The servers 130 may store information about the equipment or devices that are to be operated upon during the procedure (e.g., in a database). For example, the information may include identifying information of the devices, which may be used to compare the identifying information sensed (e.g., scanned) from the devices by the client devices 120 while performing the steps of the procedure.

Further, one or more servers 130 may also implement a monitoring system (e.g., the monitoring system 16) that monitors various states of the equipment or devices. The server 130 may maintain a database of these states. The server 130 may also store the states in which these devices are expected to be after some of the steps are performed. The server 130 may maintain a database of these expected states. During the performance of the steps of the procedure, these expected states may be compared to the actual states received as feedback from the monitoring system (16) by the client devices 120.

FIG. 3B shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the network 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the network 110. The client applications 166 also include an application that is used to perform a multi-step procedure to carry out installation, maintenance, and/or repair of a large system comprising multiple subsystems or devices according to the present disclosure.

In addition, the client device 120-1 may include one or more sensors 168 such as a barcode reader, an RFID scanner, a near-field communication (NFC) device, and so on. These sensors 168 can be used to sense identifying information from the devices (e.g., devices 12) to ascertain their identities before performing an action on them as specified in a step of the procedure.

In some implementations, the sensors 168 may also include Bluetooth transceivers that can be used to communicate with some of the devices (e.g., devices 12) that are also equipped with Bluetooth. In these implementations, the client device 120-1 may obtain the identifying information from these devices using Bluetooth. Additionally, the client device 120-1 may also send data (e.g., commands) to these devices via Bluetooth to perform the operations prescribed by the step being currently executed.

Further, some of the devices (e.g., devices 12) to be operated during the procedure may be remotely operable. Such devices may be similar to and may be implemented as the client devices 120 (e.g., some of the devices 12 may be implemented as the client devices 120). For example, these devices may be equipped with network interfaces such as those included in the client devices 120 (e.g., network interface 158), which can enable these devices to be operated and controlled remotely via the network 110. For example, the client device 120-1 running the procedure can exchange data with such remotely operable devices (e.g., devices 12 implemented as network devices 120) via the network 110. For example, the client device 120-1 running the procedure may be able to capture the identifying information from these remotely operable devices (e.g., devices 12 implemented as network devices 120) by interacting with these devices via the network 110. Further, the client device 120-1 running the procedure may be able to transmit data (e.g., commands) to these devices via the network 110 to perform the operations prescribed by a step of the procedure.

FIG. 3C shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture. The server applications 186 may also include an application that is used to perform a multi-step procedure to carry out installation, maintenance, and/or repair of a large system comprising multiple subsystems or devices according to the present disclosure. The server applications 186 may also include an application that is used to monitor the states of the devices (e.g., devices 12). The bulk storage 182 may store one or more databases 188 that store data structures used by the server applications 186 to perform respective functions (e.g., databases storing the known identifying information of the devices 12 and the expected states of the devices 12 that can occur after executing the steps of a procedure).

In use, the client device (e.g., client device 120-1, implementing the portable computing device 14) receives a plurality of steps for performing a procedure (e.g., one of the applications 166, 186, implementing the methods of FIGS. 1B and 2) on a plurality of devices (e.g., devices 12, some of which may be implemented as the client devices 120). The client device 120-1 receives the plurality of steps from a first system (e.g., server 130-1) via a network (e.g., network 110). The procedure may include an installation procedure, a repair procedure, and/or a maintenance procedure.

The client device 120-1 displays (e.g., on a GUI on display 156) data for performing a first step of the plurality of steps of the procedure. The first step indicates an action to be performed on a first device (e.g., device 12-1) of the plurality of devices. The client device 120-1 senses identifying information located on one of the plurality of devices. The client device 120-1 retrieves identifying information of the first device 12-1 stored in a database (e.g., the database 188) via the network (e.g., network 110). Alternatively, the client device 120-1 may have a local database (e.g., in bulk storage 162) comprising the identifying information of the plurality of devices. The client device 120-1 compares the sensed identifying information to the identifying information of the first device 12-1 retrieved from the database. Based on the comparison, the client device 120-1 confirms whether the one of the plurality of devices is in fact the first device (device 12-1).

If the client device 120-1 confirms based on the comparison that the one of the plurality of devices is the first device (device 12-1), the client device 120-1 allows performance of the action on the first device 12-1. For example, the client device 120-1 provides an indication on the GUI on the screen (e.g., display 156) indicating that the identity of the first device 12-1 has been confirmed and that the action specified in the first step can be performed on the identified first device 12-1.

At this point, the operator of the client device 120-1 may manually perform the operation on the identified first device 12-1. Alternatively, if the first device 12-1 is operable remotely, the client device 120-1 sends the data (e.g., a command) to perform the operation on the identified first device 12-1 (e.g., via the network 110 or via Bluetooth or other suitable interface depending on communication capabilities of the first device 12-1).

After the action is performed on the identified first device 12-1, the client device 120-1 waits for feedback about the state of the identified first device 12-1. The client device 120-1 receives feedback from a second system (e.g., server 130-2) that monitors the states of the plurality of devices.

The feedback indicates a state of the first device 12-1 after the action has been performed on the first device 12-1.

After receiving the feedback, the client device 120-1 retrieves an expected state of the first device 12-1 in which the first device 12-1 should be after the action has been performed on the first device 12-1. The client device 120-1 retrieves the expected state from the database (e.g., database 188) via the network (e.g., network 110). Alternatively, the client device 120-1 may have a local database (e.g., in bulk storage 162) comprising the expected states of the plurality of devices. The client device 120-1 confirms whether the state of the first device 12-1 received in the feedback matches the expected state of the first device 12-1 retrieved from the database.

Only after confirming that the state of the first device 12-1 received in the feedback matches the expected state of the first device 12-1, the client device 120-1 displays data for performing a second step of the plurality of steps on the GUI. Thus, the GUI-system (10) of the present disclosure ensures that the action specified in a particular step is not performed on a device other than the specified device (e.g., device 12-1 in the above example) and that the second step is not displayed on the client device 120-1 unless and until the first step is confirmed as having completed successfully.

As mentioned in the above example, when the first device 12-1 is remotely operable, during the performance of the first step, the client device 120-1 performs the action on the first device 12-1 by transmitting data to the first device 12-1. Further, depending on the type of the first device 12-1 (e.g., if the first device 12-1 is a meter) and the type of operation performed in the first step (e.g., reading the meter), the client device 120-1 also receives an input (e.g., a meter reading) from the first device 12-1 in response to performing the action on the first device 12-1. This eliminates the possibility of a human (e.g., the operator of the client device 120-1) making a mistake in reading a wrong meter, wrongly reading the correctly identified meter, or correctly reading the correctly identified meter but wrongly recording the meter reading.

Further, the client device 120-1 automatically uses the input (e.g., the meter reading) in the performance of a subsequent step (e.g., the second step). Accordingly, the operator of the client device 120-1 need not look up the meter reading that was recorded in the first step and also need not manually and possibly incorrectly read and/or input the recorded reading into the second step.

The client device 120-1 also logs an amount of time taken to complete a portion of the procedure. The client device 120-1 updates a previously used estimate of time (time budgeted) for completing the portion of the procedure based on the log. For example, the budgeted time may be T hours but the actual time was less than T hours. Accordingly, for the next cycle of the maintenance procedure, the requested downtime may be less, which increases customer productivity and improves the efficiency of performing maintenance procedure.

The client device 120-1 also logs other data associated with performing the procedure. For example, the data may include whether some of the steps consistently return data indicating that the device being tested is operating properly (as indicated by feedback matching the expected value after a step). Analyzing such recurring data may indicate that some of the steps, which may be routinely recommended by a manufacturer of the device, need not be always performed but may instead be performed less frequently or may be eliminated altogether. Thus, the client device 120-1 may recommend based on the analysis of the logged data whether to reduce a frequency of performing a portion of the procedure or whether to reduce a number of steps of the procedure. One or more machine learning algorithms may be used to perform these analyses and to make these decisions.

In some implementations, the application (i.e., the procedure) running on the client device 120-1 may need to remotely operate some devices (e.g., to switch power source for a group of devices, some of which may be located in different datacenters for example, from one power source to another). Using the GUI-based system and method of the present disclosure, a step or a series of steps to perform the above action may be displayed on the client device 120-1 as described above. The client device 120-1 may select one or more of these devices and confirm identities of the selected devices in the manner described above. After confirming their identities, the client device 120-1 may send data (e.g., commands) to the selected devices to operate the selected devices in a predetermined sequence. For example, selected and identified circuit breakers may be opened and/or closed in a desired sequence to switch the power source for a group of devices from one source to another. Again, the operations can be verified and confirmed in the manner described above, ensuring a smooth transition of power source and minimizing system downtime. Using a similar process, the original power source that was removed can be reinstated after confirming that the power source is operating properly. Many other types of applications are contemplated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A handheld device for performing a maintenance procedure comprising a plurality of sequential operations to be performed on one or more of a plurality of computing devices in a distributed computing system having a state monitor interconnected to the plurality of computing devices via a computer network, the state monitor being configured to monitor a current operating state of the individual computing device, wherein the handheld device comprising:
    a processor; and
    a non-transitory computer-readable medium to store instructions for execution by the processor, the instructions configured to:
        output data representing an instruction for performing a first operation of the maintenance procedure on a target device of the plurality of computing devices, the first operation indicating an action to be performed on the target device;
        using the handheld device, retrieve data indicating an identity of one of the plurality of computing devices;
        confirm that the one of the plurality of computing devices is the target device by comparing the retrieved data to information about the target device stored in a database;
        instruct performance of the action of the first operation on the target device after confirming that the one of the plurality of devices is the target device;
        receive, after the action of the first operation is performed on the target device, a second input from the state monitor, the second input indicating a current operating state of the target device after the action of the first operation is performed on the target device;
        confirm whether the current operating state of the target device received in the second input from the state monitor matches an expected operating state of the target device after stored in the database; and instruct performance of a second operation of the maintenance procedure after confirming that the current operating state of the target device received in the second input matches the expected operating state of the target device.

2. The handheld device of claim 1 wherein the instructions are configured to receive the plurality of operations of the maintenance procedure from a remote system via a network.

3. The handheld device of claim 1 wherein the instructions are configured to receive the first input by sensing an identifying information associated with the target device.

4. The handheld device of claim 1 wherein the instructions are configured to receive the second input and the expected operating state from a remote server via the computer network.

5. The handheld device of claim 1 wherein the instructions are configured to perform the action of the first operation on the target device by transmitting data to the target device.

6. The handheld device of claim 1 wherein the instructions are configured to:
receive and store a third input from the target device in response to performing the action of the first procedure on the target device;
retrieve the stored third input while performing the second operation; and
use the retrieved third input in the performance of the second operation.

7. The handheld device of claim 1 wherein the instructions are configured to log an amount of time taken to complete a portion of the plurality of operations and update a previously used estimate of time for completing the portion of the plurality of operations based on the logged amount of time taken to complete the portion of the plurality of operations.

8. The handheld device of claim 1 wherein the instructions are configured to:
receive a plurality of inputs from the state monitor in response to performing one or more of the plurality of operations a plurality of times;
analyze the plurality of inputs; and
determine whether to reduce a frequency of performing a portion of the maintenance procedure or whether to reduce a number of operations from the one or more of the plurality of steps based on the analyzed plurality of inputs.

9. The handheld device of claim 1 wherein the instructions are configured to:
select one or more of the plurality computing devices that are remotely operable;
confirm identities of the selected one or more of the plurality of devices; and
send data to the selected one or more of the plurality of devices after confirming the identities of the selected one or more of the plurality of devices to operate the selected one or more of the selected devices in a predetermined sequence.

10. A method for using a graphical user interface (GUI) based portable device to perform a maintenance procedure comprising multiple sequential operations to be performed on a target device in a distributed computing system having multiple additional devices interconnected via a computer network to a state monitor configured to monitor a current operating state of the target device and the multiple additional devices, the method comprising:

outputting, on a graphical user interface of the portable device, instructions for performing a first operation of the maintenance procedure on the target device from the plurality of devices;
capturing identity data from the target device and verifying identity of the target device based on the captured identity data and known identity data of the target device; and
upon verifying identity of the target device, at the portable device,
instructing, on the graphical user interface, to perform the first operation;
receiving, at the portable device, a feedback from the state monitor indicating a current operating state of the target device after the first operation is performed on the target device;
determining whether the current operating state of the target device in the received feedback matches an expected operating state of the target device after the first operation is performed on the target device;
in response to determining that the current operating state of the target device in the received feedback matches the expected operating state, outputting, on the graphical user interface of the portable device, instructions for performing a second operation of the maintenance procedure on the target device; and
in response to determining that the current operating state of the target device in the received feedback does not match the expected state, preventing output of, on the graphical user interface of the portable device, the instructions for performing the second operation of the maintenance procedure on the target device.

11. The method of claim 10 wherein capturing the identity data from the target device includes one of using the portable device to:
scan a barcode of the target device;
scan a radio frequency identifier of the target device; or
take a photograph of the target device.

12. The method of claim 10 wherein instructing to perform the first operation includes at least one of:
instructing an operator of the portable device to perform the first operation on the device; or
transmitting, from the portable device, a command to the target device to perform the first operation.

13. The method of claim 10 wherein the operations of instructing to perform the first operation, receiving the feedback from the state monitor, and determining whether the current operating state of the target device in the received feedback matches an expected operating state of the target device after the first operation is performed on the target device are performed without operator input.

14. The method of claim 10, further comprising upon detecting a failure to verify identity of the target device based on the captured identity data, displaying, via the graphical user interface, another instruction to locate the correct target device.

15. The method of claim 10 wherein:
receiving the feedback include receiving a feedback from the state monitor indicating a current power state of the target device after the first operation is performed on the target device; and
determining whether the current operating state of the target device in the received feedback matches the expected operating state of the target device includes determining whether the current power state of the target device in the received feedback matches an expected power state of the target device after the first operation is performed on the target device.

16. The method of claim 10, further comprising:
receive and store execution data of the first operation from the target device in response to performing the first procedure on the target device; and
during performance of the second operation,
retrieving the stored execution data of the first operation; and
using the retrieved execution data of the first operation in the performance of the second operation.

17. A non-transitory computer storage device storing instructions for using a graphical user interface (GUI) based portable device to perform a maintenance procedure comprising multiple sequential operations to be performed on a target device in a distributed computing system having multiple additional devices interconnected via a computer network to a state monitor configured to monitor a current operating state of the target device and the multiple additional devices, the instructions being executable by a processor to cause a computing device to perform a process including:
outputting, on a graphical user interface of the portable device, instructions for performing a first operation of the maintenance procedure on the target device from the plurality of devices;
capturing identity data from the target device and verifying identity of the target device based on the captured identity data and known identity data of the target device; and
upon verifying identity of the target device, at the portable device,
instructing, on the graphical user interface, to perform the first operation;
receiving, at the portable device, a feedback from the state monitor indicating a current operating state of the target device after the first operation is performed on the target device;
determining whether the current operating state of the target device in the received feedback matches an expected operating state of the target device after the first operation is performed on the target device;
in response to determining that the current operating state of the target device in the received feedback matches the expected operating state, outputting, on the graphical user interface of the portable device, instructions for performing a second operation of the maintenance procedure on the target device; and
in response to determining that the current operating state of the target device in the received feedback does not match the expected state, preventing output of, on the graphical user interface of the portable device, the instructions for performing the second operation of the maintenance procedure on the target device.

18. The non-transitory computer storage device of claim 17 wherein capturing the identity data from the target device includes one of using the portable device to:
scan a barcode of the target device;
scan a radio frequency identifier of the target device; or
take a photograph of the target device.

19. The non-transitory computer storage device of claim 17 wherein instructing to perform the first operation includes at least one of:
instructing an operator of the portable device to perform the first operation on the device; or
transmitting, from the portable device, a command to the target device to perform the first operation.

20. The non-transitory computer storage device of claim 17 wherein the operations of instructing to perform the first operation, receiving the feedback from the state monitor, and determining whether the current operating state of the target device in the received feedback matches an expected operating state of the target device after the first operation is performed on the target device are performed without operator input.

* * * * *